Figure 1:
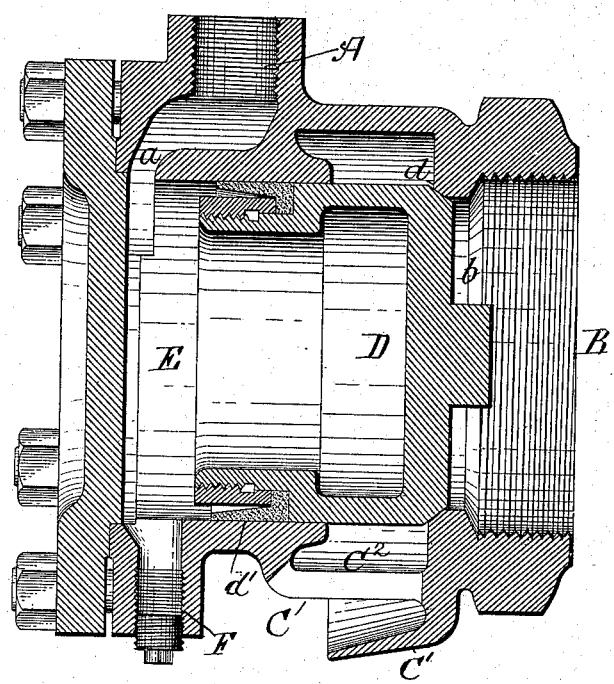

No. 757,146. PATENTED APR. 12, 1904.
R. P. C. SANDERSON.
RELIEF VALVE FOR LOCOMOTIVE ENGINE CYLINDERS.
APPLICATION FILED JAN. 26, 1904.
NO MODEL.

WITNESSES:
M. E. Flaherty
M. V. Foley

INVENTOR:
Richard P. C. Sanderson

No. 757,146. Patented April 12, 1904.

UNITED STATES PATENT OFFICE.

RICHARD P. C. SANDERSON, OF NORFOLK, VIRGINIA, ASSIGNOR TO STAR BRASS MANUFACTURING COMPANY, OF BOSTON, MASSACHUSETTS, A CORPORATION OF MASSACHUSETTS.

RELIEF-VALVE FOR LOCOMOTIVE-ENGINE CYLINDERS.

SPECIFICATION forming part of Letters Patent No. 757,146, dated April 12, 1904.

Application filed January 26, 1904. Serial No. 190,749. (No model.)

*To all whom it may concern:*

Be it known that I, RICHARD P. C. SANDERSON, a citizen of the United States, and a resident of Norfolk, in the county of Norfolk, State of Virginia, have invented a new and useful Improvement in Relief-Valves for Locomotive-Engine Cylinders, of which the following is a specification.

My invention relates to a valve which shall serve the double purpose of relieving the cylinder when there is a sudden excess of pressure in either end thereof and of supplying air to the cylinder and steam-chest to reduce in a large measure the vacuum which is created when the engine is "drifting" or running under no steam. Two such valves should be connected to each cylinder, one on each side of the piston, the other side of each valve-casing being connected with the live-steam chamber in the steam-chest. Such a valve to be practical should be simple and should rely for its operation solely upon the presence or absence of steam-pressure and should be able to operate equally well whether that pressure be high or low. In my description I shall refer to the side of the casing which is connected to the steam-chest and the corresponding side of the valve as the "upper" side and the side which is toward the cylinder as the "lower" side, although my valve may be used horizontally, as shown.

My invention (which will be understood by reference to the drawings) consists in such a valve so constructed that its position at any one time will depend upon the condition of the steam-chest—*i. e.*, whether there is any steam-pressure therein, whether the pressure is atmospheric, or whether there is a vacuum. In the first case the valve will be maintained closed by steam-pressure subject only to such momentary openings as may be necessary to relieve undue pressure in the cylinder. In the last case it will be opened by atmospheric pressure acting from without, the steam-chest having been partly exhausted of air by the movement of the piston. In this case the valve will stay open, as there will be no pressure tending to move it. In the case where the pressure in the steam-chest is atmospheric the valve will remain either closed or open, according to whether the steam-chest was last under pressure or not. For this purpose the valve is provided with a differential face, the under or cylinder side of the valve having, say, twenty or twenty-five per cent. less effective steam area than the upper side, which is connected with the steam-chest. Thus under ordinary circumstances the pressure on the upper side of the valve will be sufficient to hold the valve closed against the pressure on its under side, and when the steam is shut off at the throttle and the locomotive begins to drift and create a vacuum in the steam connections the vacuum in the steam-chest will cause the valve to open even against an equal vacuum in the other side of the valve, owing to the difference in area on the two sides of the valve. The valve when seated closes two openings— one the inlet from the cylinder to the casing, the other the opening to the atmosphere. This latter opening, unless normally closed, would allow the accumulation of dust in the casing, which would injure the valve and its seat. This second opening is open when the valve is off its seat and affords a discharge-port for water or whatever causes undue pressure in the cylinder or when the locomotive begins to drift, as an inlet for air to break the vacuum. This latter feature of the valve is of great importance, as without some such inlet from the atmosphere the vacuum in the cylinder will almost certainly draw in the products of combustion, &c., through the exhaust from the smoke-box, so that more or less dirt will be carried into the cylinder and foul the piston.

Such a valve as I have invented therefore consists of two parts—a valve-casing with suitable openings and a valve—the steam or vacuum taking the place of a spring and the arrangement of parts being such that only a single valve-seat is necessary, the valve-body being properly packed and serving as a freelymoving piston within the casing to guide the valve and also as a means for closing the discharge-port.

A valve embodying my invention is shown in the drawings, in which—

Figure 2:
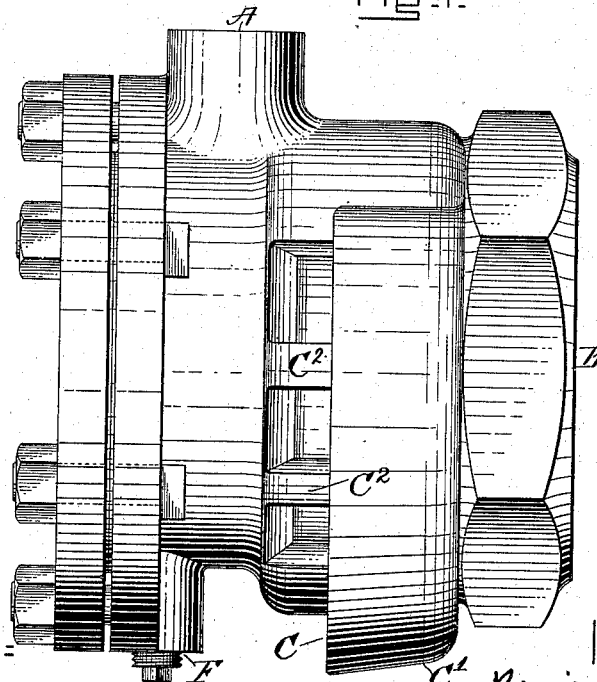

Figure 1 shows a view of such a valve in section, Fig. 2 being a side elevation.

The casing has three openings. The opening A, which I call the "upper" inlet, leads to the live steam-chamber in the steam-chest; the opening B, which I call the "under" inlet, leads to the cylinder or preferably to the inlet-port thereof, and the opening C, which I call the "side" inlet, to the atmosphere. The interior of the cylinder is provided with a valve-seat $d$, on which the valve D seats, the passage $b$, leading from the under inlet B, being less in cross-area than the valve-chamber E, into which the passage $a$ from the opening A leads and in which the valve moves. The valve fills the chamber E in cross-area, being packed at $d'$, so as to prevent any escape of air around it to the outlet C. As the upper side or cross-area of the body of the valve is somewhat greater—say twenty per cent.—than the area of its under surface, which is exposed to the steam in the passage $b$, the effectiveness of the steam or vacuum on the upper side of the valve will always be slightly greater than the opposing force, and hence will be controlling so far as the utility of the valve is concerned. It will be seen that there is no spring or other positive aid to the valve movement, and hence if the valve be open it will be closed at once when the steam fills the steam-chest whatever its pressure, whether, say, one hundred pounds or two hundred and twenty-five pounds, and in the same way it will open whenever there is a vacuum sufficient to move it irrespective of the fact that the same vacuum exists on both sides of the valve.

The side opening C extends for some distance around the valve-casing, and I have shown it as provided with a protecting-lip C' to serve as a shield to keep foreign matters out of the valve, the valve in its preferred location lying horizontal, the lip serving to direct the escape from interfering with the engineer's vision. Uprights $C^2$ serve to strengthen the valve-casing without interfering materially with the freedom of exit of steam or water through the passage C. A plugged opening F is provided to allow the valve to be drained, if necessary.

My valve is especially designed for use with locomotives and has been found especially valuable for such use, although it may be used in other engines. The promptness with which it opens to supply air when the locomotive is drifting and the equal promptness with which it closes when the throttle is opened again, as has been demonstrated in practice, together with its ability to act irrespective of the amount of steam-pressure in the boiler or of the amount of vacuum, renders it an important adjunct to the locomotive.

What I claim as my invention is—

1. A relief-valve comprising a casing provided with an upper inlet adapted to be connected with the steam-chest, an under inlet adapted to be connected with the cylinder, and a side inlet leading to the atmosphere and located between the other two inlets, a valve located between said upper and lower inlets, and adapted to slide freely in said casing toward and from its seat and close the passage between said upper and under inlets, the under surface of said valve seating on the edge of said under inlet, said valve having a bearing-surface extending from its seating-surface upward and adapted to close said side inlet when the valve is seated, as described.

2. The relief-valve structure above described consisting of a casing and a valve, said casing having a valve-seat and an inlet below the valve-seat, a cylindrical chamber above the valve-seat, an inlet leading into said cylindrical chamber above said valve, and a side inlet leading from the atmosphere into said chamber just above the valve-seat, said valve being substantially cylindrical in shape, its lower end being beveled to conform to the shape of the valve-seat, said lower inlet being of less diameter than the diameter of the valve, said valve when seated closing said side inlet, and the valve above its seat serving as a bearing to guide said valve in its passage off and onto its seat, as described.

3. A relief-valve comprising two members, a valve-casing and a valve, said casing having an upper inlet, a lower inlet, and a side inlet connected to the atmosphere, and a cylindrical passage connecting said upper and said lower inlets, said lower inlet being less in cross-area than the said passage above it, and having a valve-seat about its upper edge, said valve being located in said passage and adapted to close upon said valve-seat and close said lower and side inlets, and at all times separate said upper and lower inlets and to be moved or retained in place by an excess of steam pressure or vacuum upon its upper or lower side as the case may be, as described.

RICHARD P. C. SANDERSON.

In presence of—
JAMES F. WRIGHT,
JOSEPH MURDAUGH.